US008396416B2

(12) United States Patent
Kenington

(10) Patent No.: US 8,396,416 B2
(45) Date of Patent: Mar. 12, 2013

(54) RADIO SYSTEM AND A METHOD FOR RELAYING RADIO SIGNALS

(75) Inventor: Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 387 days.

(21) Appl. No.: 12/416,639

(22) Filed: Apr. 1, 2009

(65) Prior Publication Data
US 2010/0255775 A1  Oct. 7, 2010

(51) Int. Cl.
*H04B 1/60* (2006.01)
(52) U.S. Cl. ............................ 455/9; 455/561; 455/562.1
(58) Field of Classification Search .................. 455/561, 455/562.1, 9
See application file for complete search history.

(56) References Cited

U.S. PATENT DOCUMENTS

| | | | |
|---|---|---|---|
| 4,415,418 A | 11/1983 | Turre et al. | |
| 5,852,630 A | 12/1998 | Langberg et al. | |
| 5,989,402 A | 11/1999 | Chow et al. | |
| 6,157,343 A | 12/2000 | Andersson et al. | |
| 6,510,191 B2 | 1/2003 | Bockelman | |
| 7,194,021 B2 | 3/2007 | Darbel et al. | |
| 7,580,686 B2 | 8/2009 | Fonden et al. | |
| 2002/0097085 A1 | 7/2002 | Stapleton | |
| 2002/0110211 A1 | 8/2002 | Bockelman | |
| 2003/0164961 A1 | 9/2003 | Daly | |
| 2003/0236107 A1 | 12/2003 | Azuma | |
| 2004/0204098 A1 | 10/2004 | Owen | |
| 2005/0110565 A1 | 5/2005 | Robinson | |
| 2005/0111575 A1 | 5/2005 | Taler et al. | |
| 2005/0282506 A1* | 12/2005 | Azuma ...................... | 455/115.1 |
| 2007/0051628 A1 | 3/2007 | Dolnik | |
| 2008/0095266 A1 | 4/2008 | Rashev et al. | |
| 2008/0219331 A1 | 9/2008 | Liang et al. | |
| 2008/0232492 A1 | 9/2008 | Xiao et al. | |
| 2009/0034651 A1 | 2/2009 | Lan et al. | |
| 2010/0166109 A1 | 7/2010 | Neumann et al. | |
| 2010/0166110 A1 | 7/2010 | Neumann et al. | |

FOREIGN PATENT DOCUMENTS

| | | |
|---|---|---|
| DE | 202005009960 | 9/2005 |
| EP | 0295942 | 12/1988 |
| EP | 1120858 | 8/2001 |
| EP | 1389837 | 2/2004 |
| EP | 1486778 | 12/2004 |
| EP | 1543935 | 6/2005 |
| EP | 1608082 | 12/2005 |

(Continued)

OTHER PUBLICATIONS

International Preliminary Report issued on Oct. 4, 2011 in PCT/EP2010/053694.*

(Continued)

*Primary Examiner* — Lincoln Donovan
*Assistant Examiner* — Shikha Goyal
(74) *Attorney, Agent, or Firm* — Stephen H. Eland; Dann, Dorfman, Herrell & Skillman

(57) ABSTRACT

The present invention provides a radio system and a method for relaying radio signals. The radio system and the method provide a calibration of transmit radio signals in which no dedicated calibration signal generator is required for calibrating the radio system. The radio system comprises at least one transmit path, a calibration unit at the least one link. A coupled transmit signal is extracted from the transmit paths and selectively forwarded as a feedback signal to a feedback signal demodulator. The feedback signal demodulator generates a base band feedback signal adapted for updating phase and amplitude changes applied a calibrated payload signal.

23 Claims, 5 Drawing Sheets

FOREIGN PATENT DOCUMENTS

| | | |
|---|---|---|
| EP | 1608082 A2 * | 12/2005 |
| EP | 1120858 | 4/2007 |
| EP | 1649614 | 11/2010 |
| JP | 2005331411 | 12/2005 |
| WO | 96/15585 | 5/1996 |
| WO | 96/33405 | 10/1996 |
| WO | 03/019773 | 3/2003 |
| WO | 2010/038227 | 4/2010 |

OTHER PUBLICATIONS

Patient Test Procedure Brochure, www.ReliaLAB.com, printed Jun. 2005, 7 pages.

Vrouwe et al, Direct Measurement of Lithium in Whole Blood Using Microchip Capillary Electrophoresis With Integrated Conductivity Detection (XP-002447049), Electrophoresis, 2004, 25, pp. 1660-1667.

Vrouwe et al, Microchip Analysis of Lithum in Blood Using Movin Boundary Electrophoresis and Zone Electrophoresis (XP-002447050), Electrophoresis, 2005, pp. 3032-3042.

Invitation to Pay Additional Fees (Form PCT/ISA/206) issued in PCT/EP2007/004468 on Nov. 27, 2007, 12 pages.

International Search Report & Written Opinion issued in International Patent Application No. PCT/EP2010/053713 dated Jul. 1, 2010.

International Search Report & Written Opinion issued in International Patent Application No. PCT/EP2010/053694 dated Nov. 11, 2010.

International Search Report & Written Opinion issued in International Patent Application No. PCT/EP2010/053703 dated Nov. 11, 2010.

International Search Report & Written Opinion issued in International Patent Application No. PCT/EP2010/053707 dated Jun. 14, 2010.

International Preliminary Report & Written Opinion for PCT/EP2010/053703 issued on Oct. 4, 2011.

* cited by examiner

RADIO SYSTEM AND A METHOD FOR RELAYING RADIO SIGNALS

CROSS REFERENCE TO OTHER APPLICATIONS

The present application is related to "Radio system and method for relaying radio signals with a power calibration of transmit radio signals" Ser. No. 12/416,630 filed concurrently on Apr. 1, 2009 and to "A Radio System And A Method For Relaying Radio Signals" Ser. No. 12/416,596 filed concurrently on Apr. 1, 2009 and to "A Radio System And A Method For Relaying Packetized Radio Signals" Ser. No. 12/416,626 filed concurrently on Apr. 1, 2009. The entire disclosure of each of the foregoing applications is incorporated herein by reference.

FIELD OF THE INVENTION

The field of the present invention relates to a radio system for relaying radio signals with a calibration of transmitted radio signals. The field of the present invention further relates to a method for relaying radio signals with a calibration of transmitted radio signals. Furthermore, the field of the present invention relates to a computer program product enabling a foundry to manufacture the radio system for relaying radio signals and a computer program product enabling a processor to carry out the method for relaying radio signals.

BACKGROUND OF THE INVENTION

Use of mobile communications networks has tremendously increased over the last decade. Operators of the mobile communications networks have increased a number of base stations in order to meet an increased demand for service by users of the mobile communications network. The base stations typically comprise radio systems for relaying radio signals, including software and hardware components. The radio signals are typically relayed into a cell of the mobile communications network. The operators of the mobile communications network wish to reduce the costs of the base stations. It is one option to implement the radio system embedded within an antenna array in order to reduce the costs of the base station. For the radio system embedded in the antenna array components of the radio system are implemented on a chip. Implementing the radio system embedded within the antenna array reduces real estate needed to house the hardware components of the base station. Substantially all of the hardware components of the radio system are implemented embedded in the antenna array. The amount of the real estate to house the radio system is thereby reduced. Power consumption during normal operation of the radio system is substantially reduced when implementing the radio system embedded within the antenna array.

It is of interest to provide a reliable quality of service to an individual user of the mobile communications network given the increase in the number of users. Several techniques have been suggested in order to deal with the increased number of users within the mobile communications network. One of the several techniques comprises beam forming capabilities in order to direct a beam relayed by the radio system in different directions to improve service coverage within the cells of the mobile communications network. The beam forming techniques rely on defined phase and amplitude relations between several ones of the antenna elements of the active antenna system. Calibration of transmit paths and receive paths is required to provide the defined phase and amplitude relationship between the beams. The calibration allows the estimation of a phase and amplitude deviation accumulated along the transmit path of the radio system. Likewise the calibration comprises estimating a phase and amplitude deviation accumulated along the receive paths of the radio system. In a second step the phase and amplitude deviation accumulated along the transmit paths can be corrected. An appropriate phase and amplitude change may be applied to the individual ones of the transmit paths to yield the defined phase and amplitude relationship between the individual ones of the transmit paths of the radio system in order to allow for beam forming techniques.

A technique of analogue or digital predistortion is known in the art. It is to be understood that the present invention may be combined with an analogue or digital predistortion technique in order to linearise transfer characteristics of the radio system. Such a combination is disclosed in a co-pending application of the applicant Ser. Nos. 12/416,596 and 12/416,626.

The present invention may be implemented as part of a radio system monitoring a radio frequency (RF) transmit power in order to help the beam forming techniques. Details of such a combination are disclosed within a co-pending application of the applicant Ser. No. 12/416,630.

In the prior art it is common to use a calibration signal generator in order to provide a calibration signal. The calibration signal is used to calibrate the phase and amplitude changes applied to the transmit path in order to obtain the defined phase and amplitude relation between the transmit paths. Typically the calibration signal is hidden within a payload signal that is to be relayed along the transmit paths. Alternatively a dedicated calibration signal may be used during idle times of the radio system. A disadvantage of the calibration signal being applied during idle times of the radio system is twofold. Firstly the calibration signal is visible to other radio systems and to the other users within the cell of the mobile communications network. Therefore signal-to-noise ratio (SNR) for the other radio systems and/or the users present within the cell would be deteriorated. Burying or hiding the calibration signal within the payload signals is common practise. Hiding the calibration signal overcomes the disadvantage of unwanted calibration signals being relayed and visible to the other radio systems and/or the users within the cell of the mobile communications network. A disadvantage of the hiding of the calibration signal is the low SNR of the hidden calibration signal. Hence one is confronted with very poor SNR values when comparing the original calibration signal with the calibration signal hidden in the payload signal that has travelled along the transmit paths. Consequently the low SNR of the hidden calibration signal makes the calibration using the hidden calibration signal difficult.

US 2003/0236107 to Tomohiro Azuma provides a calibration system for an antenna array receiving apparatus as used for cellular mobile communication systems. In the antenna receiving apparatus of the Azuma calibration system, a calibration time determining unit determines an adaptive calibration time based on detection voltages of the total reception power inputted to antenna radio receiving units. A calibration signal processing unit detects phase and amplitude information of a calibration signal. The Azuma calibration system uses a dedicated calibration signal for carrying out the calibration. The calibration signal within the Azuma system is further hidden within a payload signal being relayed by the antenna system.

SUMMARY OF THE INVENTION

A radio system for relaying radio signals according to the present invention comprises: at least one transmit path, a calibration unit, at least one link and a feedback path. The at least one transmit path is adapted to relay a calibrated payload signal as a transmit signal. The calibration unit is adapted to split a payload signal into at least one calibrated payload signal. The calibration unit is further adapted to apply phase and amplitude changes to the calibrated payload signal. The at least one link is adapted to forward the calibrated payload signal to the at least one transmit path. Phase and amplitude changes applied to the calibrated payload signal are updated in response to a feedback signal in the feedback path.

The present invention is adapted to carry out a calibration of the transmit paths using the payload signal.

The phase and amplitude changes are updatable using correlations of the payload signal and a base band feedback signal generated from the feedback signal. It is to be understood that the correlations, i.e. the use of correlating techniques comprise correlating two signals, for example the base band feedback signal and the payload signal. The two signals need to be within substantially the same frequency band. The base band feedback signal and the payload signal are typically provided in the base band of the radio system. Without any limitation it is possible to provide the payload signal and the feedback signal at an intermediate frequency when carrying out the correlations. The intermediate frequency band may be any frequency band between the base band of the radio system and the band of transmission of the radio system.

The term "relaying" as used herein shall be construed as comprising a transmitting as well as a receiving of radio signals. The receiving of the radio signals is commonly referred to as Rx. The transmitting of the radio signals is commonly referred to as Tx.

The radio system as described herein enables a reduction of hardware components needed for calibrating the transmit paths. This allows for reducing costs of manufacture of the radio system as described herein.

According to a further aspect the present invention relates to a method for relaying radio signals. The method comprises providing a payload signal and generating a calibrated payload signal. The providing of the calibrated payload signal comprises applying phase and amplitude changes to at least one of the calibrated payload signals. The generating of the calibrated payload signal comprises splitting the payload signal into more than one calibrated payload signal. There is no calibration signal generator needed for the generating of the calibrated payload signal. The method comprises forwarding a transmit signal along at least one transmit path. According to the method a selected one of coupled transmit signals is fed back into a feedback path as a feedback signal. The method comprises updating the phase and amplitude changes in response to the feedback signal in the feedback path.

The present invention further provides a computer program product for a manufacture of the radio system according to the invention.

In yet another aspect the present invention provides a computer program product for carrying out the method according to the invention.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will also be understood that features of one aspect can be combined with a feature of a different aspect.

Figure 1:
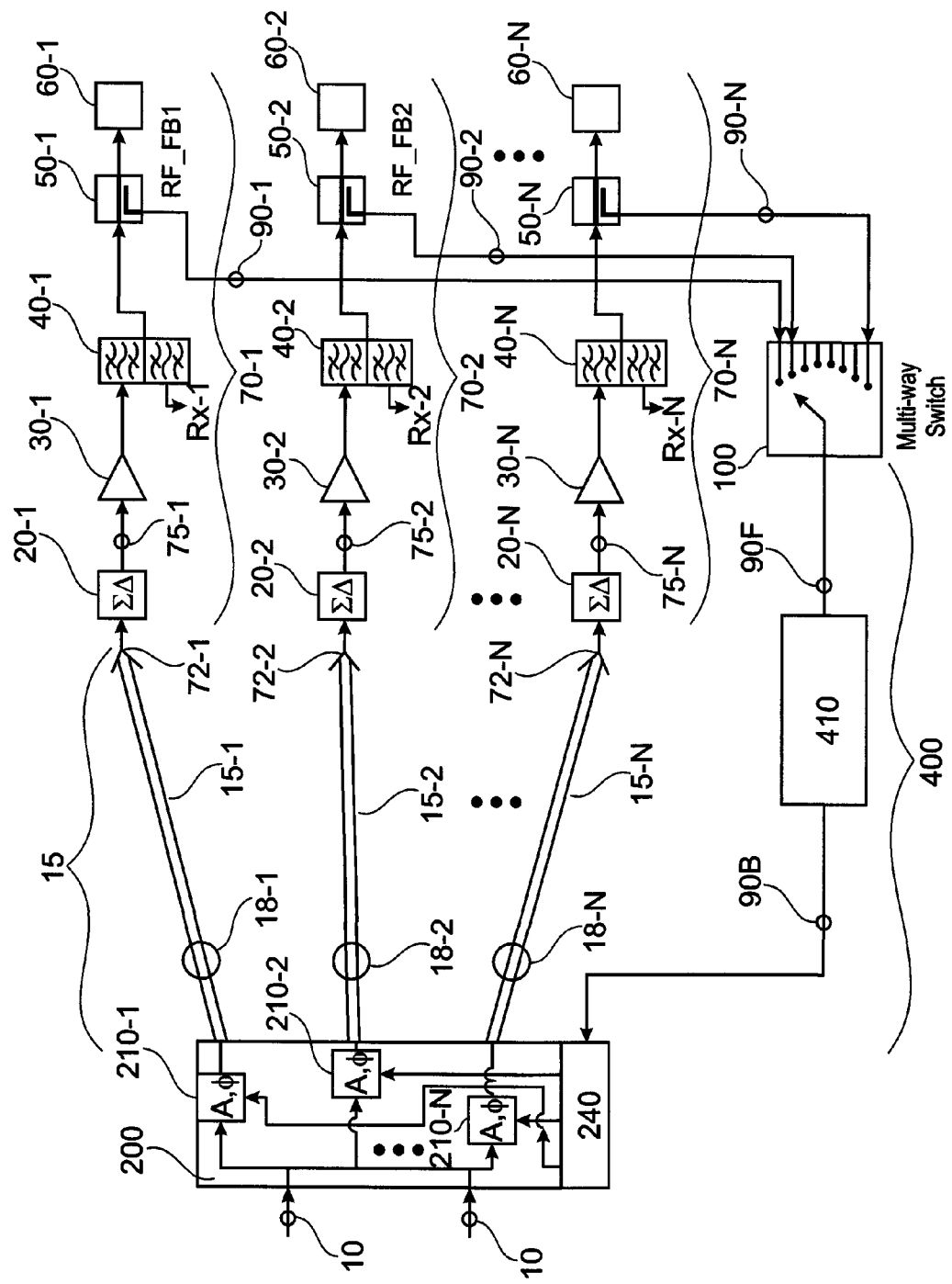
FIG. 1 shows a radio system.

FIG. 1 shows a radio system 1. A payload signal 10 is forwarded to the radio system 1. Typically the payload signal 10 is provided in a format comprising an in phase component I and a quadrature phase component Q. The payload signal 10 is forwarded to a digital radio interface (DRI) as is known in the art. The digital radio interface may be implemented in one non-limiting aspect of the invention according to the open base station architecture initiative standard (OBSAI). A calibration unit 200 is adapted to split the payload signal 10 into at least one calibrated payload signal 18-1, 18-2, ..., 18-N. The calibration unit 200 is further adapted to apply phase and amplitude changes 210-1, 210-2, ..., 210-N to the calibrated payload signal 18-1, 18-2, ..., 18-N. The calibrated payload signal is forwarded along at least one link 15-1, 15-2, ..., 15-N. The links 15-1, 15-2, ..., 15-N are adapted to forward the calibrated payload signals 18-1, 18-2, ..., 18-N to the transmit paths 70-1, 70-2, ..., 70-N. The transmit paths 70-1, 70-2, ..., 70-N comprise an entry port 72-1, 72-2, ..., 72-N. The transmit paths 70-1, 70-2, ..., 70-N receive the calibrated payload signals 18-1, 18-2, ..., 18-N at the entry ports 72-1, 72-2, ..., 72-N. Within FIG. 1 there are only three of the transmit paths 70-1, 70-2, ..., 70-N shown. Obviously any other number of transmit paths 70-1, 70-2, ..., 70-N is conceivable. The links 15-1, 15-2, ..., 15-N may be physically flexible. The links 15-1, 15-2, ..., 15-N, may apply individual ones of link phase and amplitude deviations to the calibrated payload signals 18-1, 18-2, ..., 18-N. The calibrated payload signal 18-1, 18-2, ..., 18-N is in a digital domain. More precisely the calibrated payload signal 18-1, 18-2, ..., 18-N is in the base band of the radio system 1 as is the payload signal 10. It is to be noted that the payload signal 10 and the calibrated payload signal 18-1, 18-2, ..., 18-N may be without any limitation be provided at an intermediate frequency band IF. The intermediate frequency band IF may be any frequency band between the base band frequency of the radio system 1 and a frequency of transmission of the radio system 1. In other words the phase and amplitude changes 210-1, 210-2, ..., 210-N may be applied to the payload signal 10 at the intermediate frequency instead of the base band. The links 15-1, 15-2, ..., 15-N provide spatial flexibility with respect to how the transmit paths 70-1, 70-2, ..., 70-N are arranged. The arrangement of the transmit paths 70-1, 70-2 ..., 70-N will be mostly governed by a spatial arrangement of antenna elements 60-1, 60-2, ..., 60-N terminating the transmit paths 70-1, 70-2, ..., 70-N, The links 15-1, 15-2, ..., 15-N will cause a variation in link time needed for the calibrated payload signal 18-1, 18-2, ..., 18-N to travel from the calibration unit 200 to the entry ports 72-1, 72-2, ..., 72-N of the transmit paths 70-1, 70-2, ..., 70-N.

It is to be understood that the links 15-1, 15-2, ..., 15-N provide a greater flexibility in spatially arranging the transmit paths 70-1, 70-2, ..., 70-N.

Each one of the transmit paths 70-1, 70-2, ..., 70-N is terminated by the antenna element 60-1, 60-2, ..., 60-N. Therefore the providing of the links 15-1, 15-2, ..., 15-N provides a greater flexibility in spatially arranging the transmit paths 70-1, 70-2, ..., 70-N and hence the antenna element 60-1, 60-2, ..., 60-N forming an active antenna array. As is known in the art active antenna elements 60-1, 60-2, ..., 60-N forming an antenna array are sensitive to delay times for travelling along the transmit paths 70-1, 70-2, ..., 70-N. Any change in the transmit times will correspond to a transmit deviation 90T accumulated along the transmit paths 70-1, 70-2, ..., 70-N. The transmit deviations 90T need to be corrected in order to reach the defined phase and amplitude relation that is needed using the beam forming techniques.

The antenna elements 60-1, 60-2, ..., 60-N may be transmit-only antenna elements. Alternatively or additionally, the antenna element 60-1, 60-2, ..., 60-N may be transmit and receive antenna elements. Only the transmit paths 70-1, 70-2, ..., 70-N are shown in FIG. 1. The radio system 1 may be combined with a receive system as known in the art. The receive system is not shown but will comprise receive paths Rx-1, Rx-2, ..., Rx-N. The calibrated payload signal 18-1, 18-2, ..., 18-N reaching the entry port 72-1, 72-2, ..., 72-N of the transmit paths 70-1, 70-2, ..., 70-N is forwarded along the transmit paths 70-1, 70-2, ..., 70-N as a transmit signal 75-1, 75-2, ..., 75-N as is known in the art.

The transmit signals 75-1, 75-2, ..., 75-N are digital to analogue converted using a digital to analogue converter 20-1, 20-2, ..., 20-N along the transmit paths 70-1, 70-2, ..., 70-N. The digital to analogue converter 20-1, 20-2, ..., 20-N may comprise a sigma delta digital to analogue converter, as shown in FIG. 1. The sigma delta digital to analogue converters 20-1, 20-2, ..., 20-N do not require an up-converter for up-converting and filtering the transmit signal 75-1, 75-2, ..., 75-N. An amplifier 30-1, 30-2, ..., 30-N is provided for amplifying the transmit signal 75-1, 75-2, ..., 75-N. A filter 40-1, 40-2, ..., 40-N is provided for separating the transmit paths 70-1, 70-2, ..., 70-N from the receive paths Rx-1, Rx-2, ..., Rx-N. The filter 40-1, 40-2, ..., 40-N may be implemented as a duplex filter as shown in FIG. 1. The filters 40-1, 40-2, ..., 40-N are adapted to eliminate any signal components that are out of a frequency band of transmission of the radio system 1.

In order to allow for a calibration of the radio system 1, a portion of the transmit signals 75-1, 75-2, ..., 75-N is fed back to the calibration unit 200. The present invention provides a coupler 50-1, 50-2, ..., 50-N to extract the portion of the transmit signal 75-1, 75-2, ..., 75-N as a coupled transmit signal 90-1, 90-2, ..., 90-N. The feedback of the coupled transmit signals 90-1, 90-2, ..., 90-N allows for determining phase and amplitude deviations accumulated between individual ones of the transmit signals 75-1, 75-2, ..., 75-N travelling along the links 15-1, 15-2, ..., 15-N and the transmit paths 70-1, 70-2, ..., 70-N.

A calibration update unit 240 uses the feedback path 400, more precisely signals relayed along the feedback path 400, in order to update the phase and amplitude changes 210-1, 210-2, ..., 210-N applied to the calibrated payload signal 18-1, 18-2, ..., 18-N.

A switch 100 is adapted to forward a selected one of the coupled transmit signals 90-1, 90-2, ..., 90-N as a feedback signal 90F into the feedback path 400. The feedback path 400 comprises a feedback signal demodulator 410. The feedback signal demodulator 410 is adapted to receive the feedback signal 90F from the switch 100. It is to be understood that the feedback signal 90F comprises an analogue radio frequency (RF) signal within the frequency range of transmission of the transmit paths 70-1, 70-2, ..., 70-N. It is conceivable, that the couplers 50-1, 50-2, ..., 50-N couple not only to their respective antenna element 60-1, 60-2, ..., 60-N but further to an adjacent antenna element. Furthermore the couplers 50-1, 50-2, ..., 50-N may couple to RF signals received by the antenna elements 60-1, 60-2, ..., 60-N. Neither the RF signals received by the antenna element 60-1, 60-2, ..., 60-N nor the RF signals from next neighbouring antenna elements are of relevance for a calibration of the transmit paths 70-1, 70-2, ..., 70-N. It may be of interest to provide filtering elements (not shown) downstream of the couplers 50-1, 50-2, ..., 50-N. The filter elements (not shown) may be arranged between the couplers 50-1, 50-2, ..., 50-N and the switch 100. Alternatively and without any limitation the filtering elements (not shown) may also be provided downstream of the switch 100. An individual filtering element downstream of the switch 100 may need to incorporate all the filtering characteristics of the filtering elements disposed between the couplers 50-1, 50-2, ..., 50-N and the switch 100, when implementing the individual filtering element arranged downstream of the switch 100. As a further alternative any filtering capabilities needed may be incorporated within the feedback signal demodulator 410.

The feedback signal demodulator 410 receives the feedback signal 90F from the switch 100. The feedback signal demodulator 410 may be adapted to attenuate the feedback signal 90F if necessary. The feedback signal demodulator 410 is adapted to analogue to digital convert the feedback signal 90F. The feedback signal demodulator 410 may comprise a sigma delta converter for the analogue to digital converting. The feedback signal demodulator 410 may without any limitation comprise conventional analogue to digital converters. A down converter functionality (not shown) is also needed, when using conventional analogue to digital converters for the analogue to digital converting. As mentioned before, the feedback signal demodulator 410 may further comprise a filtering functionality. The feedback signal demodulator generates a base band feedback signal 90B. It is to be understood that the base band feedback signal 90B comprises a digital, packetized signal. The base band feedback signal 90B is forwarded to the calibration update module 240.

It will be appreciated by a person skilled in the art that a splitter (not shown) downstream of a chosen one of the couplers 50-1, 50-2, ..., 50-N may be used to extract a portion of a chosen coupled transmit signal 90-1, 90-2, ..., 90-N. Without any limitation it is possible to provide more than one of the splitters (not shown). The splitter (not shown) may be used to forward the portion of the coupled transmit signal to a power detector (not shown).

It will be appreciated by a person skilled in the art that the switch 100 may be replaced by a combiner (not shown). The use of the combiner may entail incorporating switches and/or attenuators (not shown) in order to suppress at least one selected one of the coupled transmit signals 90-1, 90-2, ..., 90-N. Furthermore, one or more of the transmit path signals 75-1, 75-2, ..., 75-N could be disabled in the calibration unit 200 as an alternative to utilising hardware switches in either the forward transmit path(s) 70-1, 70-2, ..., 70-N or the feedback path 400.

A position of the switch 100 is controlled by the calibration unit 200 and/or the feedback signal demodulator 410. In other words the calibration unit 200 knows which one of the coupled transmit signals 90-1, 90-2, ..., 90-N is to be forwarded to the feedback signal demodulator 410 as the feedback signal 90F in the feedback path 400.

Figure 2:
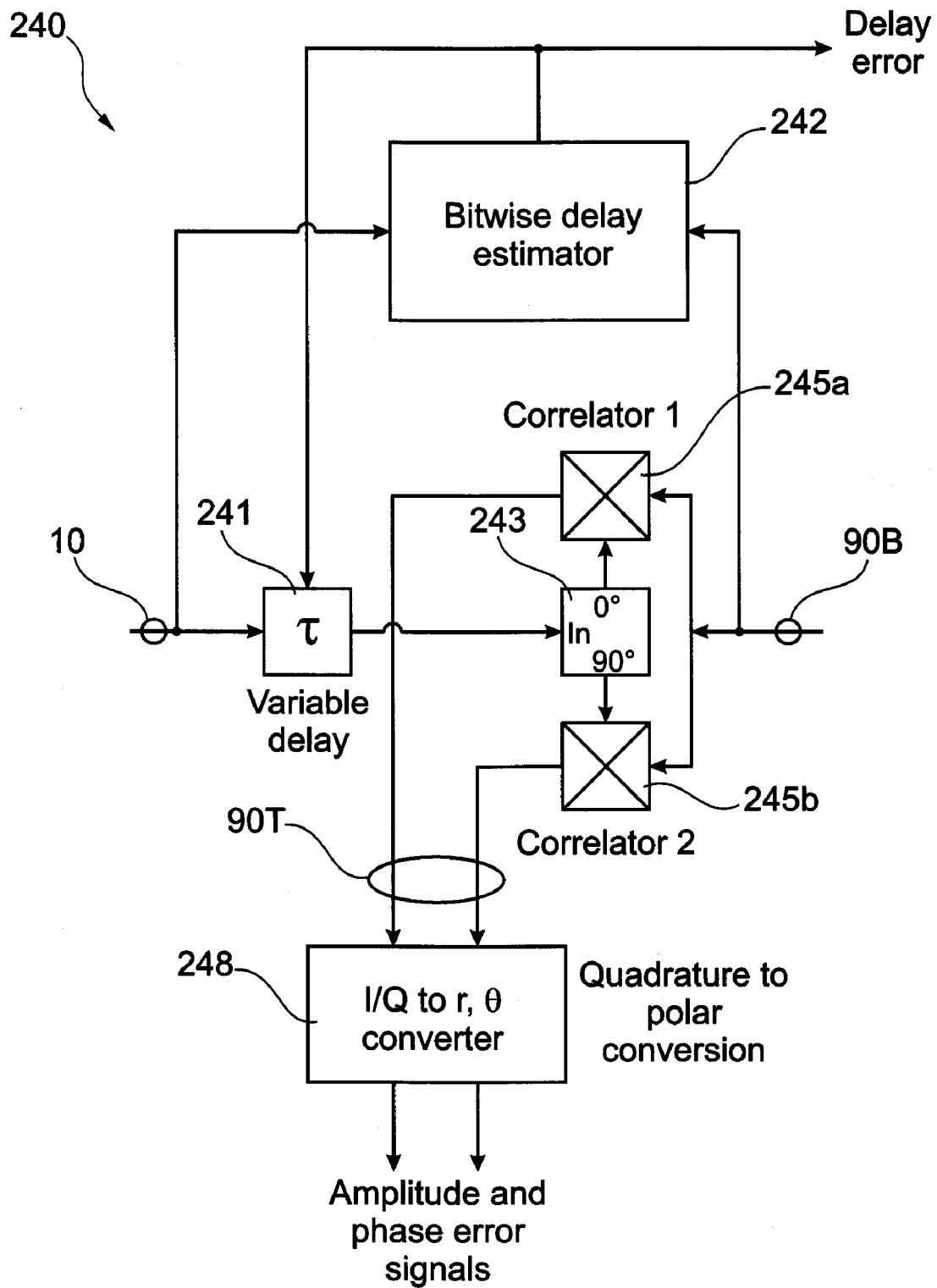
FIG. 2 shows a calibration update module.

FIG. 2 shows the calibration update unit 240 in more detail. The payload signal 10 is provided to the calibration update unit 240 and a variable delay 241 is added to the payload signal 10. The variable delay 241 may, for example, compensate the time required for the calibrated payload signal 18-1, 18-2, ..., 18-N to travel along the link 15-1, 15-2, ..., 15-N, the transmit path 70-1, 70-2, ..., 70-N and the feedback path 400 reaching the feedback signal demodulator 410 and the calibration update unit 240 as the base band calibration signal 90B.

The (delayed) payload signal 10 is forwarded to a splitter 243 splitting the (delayed) payload signal 10 into the in-phase component I and the quadrature Q. The in-phase component I of the (delayed) payload signal 10 is forwarded to a first correlator 245a. The quadrature component Q of the (delayed) payload signal 10 is forwarded to a second correlator 245b. The first correlator 245a and the second 245b are adapted to deduce transmit deviations 90T between the base band feedback signal 90B and the (delayed) payload signal 10. More precisely, the first correlator 245a and the second correlator 245b correlate the in-phase component I and the quadrature component Q of the (delayed) payload signal 10 with the base band feedback signal 90B.

The calibration update unit further comprises a delay estimator 242. The delay estimator 242 is adapted to estimate a delay between the payload signal 10 and the base band calibration signal 90B. The delay estimator 242 is used in order to give a first estimate of the variable time delay 241 that needs to be added to the payload signal 10 before correlating the in phase component I and the quadrature component Q of the (delayed) payload signal 10 with the base band calibration signal 90B.

The calibration update unit 240 further comprises a converter module 248. The converter module 248 converts the transmit deviation 90T provided in an in phase I and quadrature component Q format into the transmit deviations 90T in a polar format comprising a phase deviation and an amplitude deviation. The transmit deviations 90T represented in the polar format provide the phase and the amplitude deviation that is accumulated along the links 15-1, 15-2, ..., 15-N, the transmit paths 70-1, 70-2, ..., 70-N and the feedback path 400 of the radio system 1. It will be appreciated by a person skilled in the art that phase and amplitude deviations accumulated between the switch 100 and the calibration update module 240 are substantially identical for all the coupled transmit signals 90-1, 90-2, ..., 90-N. It is implicitly assumed that the phase and amplitude deviations accumulated between the couplers 50-1, 50-2, ..., 50-N and the switch 100 are substantially identical for all the transmit paths 70-1, 70-2, ..., 70-N with the design as shown in FIG. 1. Alternatively, the phase and amplitude deviations accumulated between the couplers 50-1, 50-2, ..., 50-N and the switch 100 could be known, e.g. through a calibration upon manufacture of either the components/cables themselves or of the whole radio system 1. These known gain/phase properties could then be taken into account during the in-operation calibration process of the radio system 1.

It is to be understood that the radio system 1 does not rely on a dedicated calibration signal as used in the prior art systems. Hence there is no dedicated calibration signal generator required, reducing the hardware costs of the radio system 1 and eliminating interference with the wanted payload signals 10 or interference with adjacent (in space or frequency) radio systems.

Typically the radio system 1 is connected to at least two antenna elements 60-1, 60-2, ..., 60-N such that a defined phase and amplitude relation between individual ones of the transmit paths 70-1, 70-2, ..., 70-N, can be provided. The defined phase and amplitude relation between the individual ones of the transmit paths 70-1, 70-2, ..., 70-N is required for techniques such as beam forming, beam tilting, a direction of arrival (DoA) detection, as is known in the art. The radio system 1 is adapted to carry out these techniques. The transmit deviations 90T determined by the calibration update module 240 serve as a basis to apply phase and amplitude changes 210-1, 210-2, ..., 210-N to yield the defined phase and amplitude relation between the individual ones of the transmit paths 70-1, 70-2, ..., 70-N. The phase and amplitude changes 210-1, ..., 210-N are applied to the calibrated payload signals 18-1, 18-2, ..., 18-N yielding the defined phase and amplitude relation between the antenna elements 60-1, 60-2, ..., 60-N.

Figure 3A:
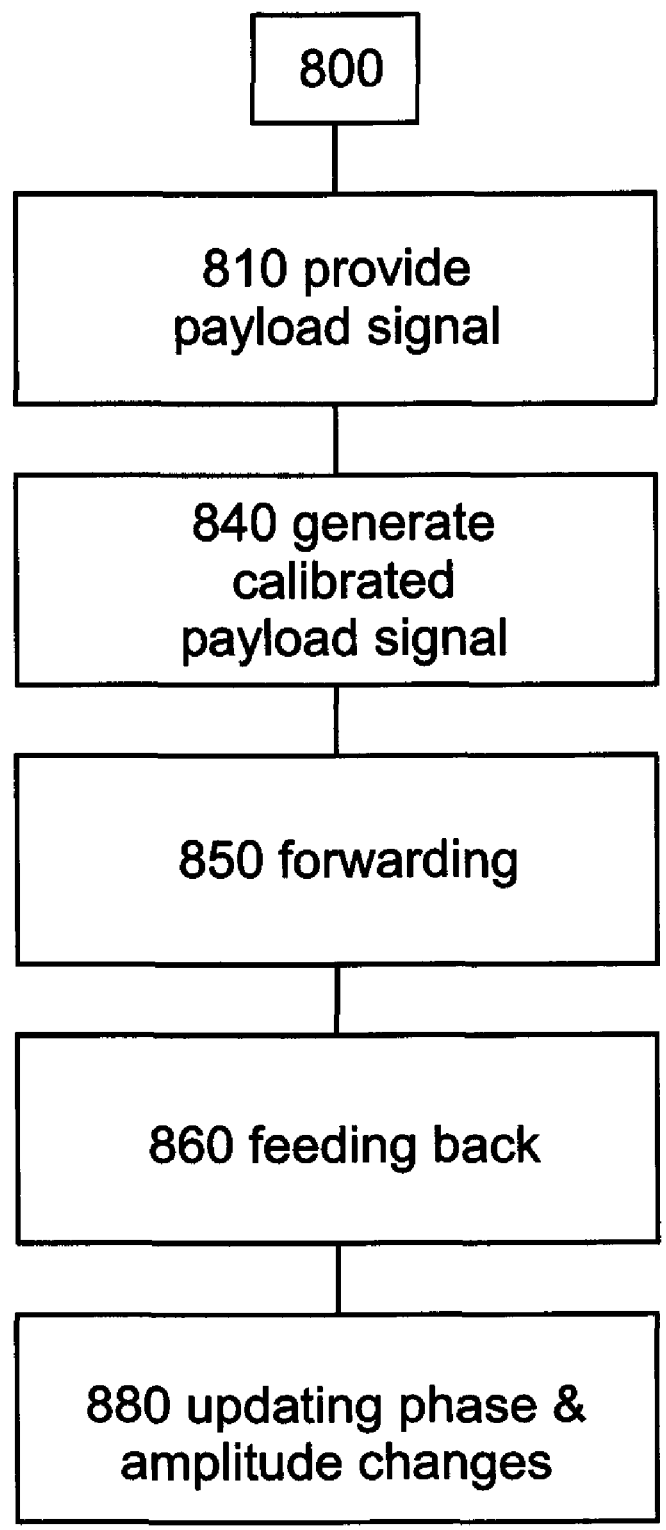
FIG. 3a shows a flow chart of the method for relaying radio signals.

The present system further provides a method 800 for relaying radio signals. FIG. 3a shows a flow chart of the method 800.

In a step 810 the payload signal 10 is provided. The payload signal 10 may be provided comprising the in-phase component I and the quadrature component Q in pairs (I, Q), as is known in the art. The payload signal 10 may be provided at a digital radio interface DRI as explained above.

In a step 840 the calibrated payload signal 18-1, 18-2, ..., 18-N is generated. The calibrated payload signal 18-1, 18-2, ..., 18-N is generated by applying the phase and amplitude changes 210-1, 210-2, ..., 210-N to the payload signal 10. In a step 850 the transmit signal 75-1, 75-2, ..., 75-N is forwarded along the transmit path 70-1, 70-2, ..., 70-N. A step 860 comprises feeding back a selected one of the coupled transmit signals 90-1, 90-2, ..., 90-N as the feedback signal 90F into the feedback path 400. A step 880 comprises an updating of the phase and amplitude changes 210-1, 210-2, ..., 210-N. The updating 880 may be implemented in response to the feedback signal 90F in the feedback path 400.

Figure 3B:
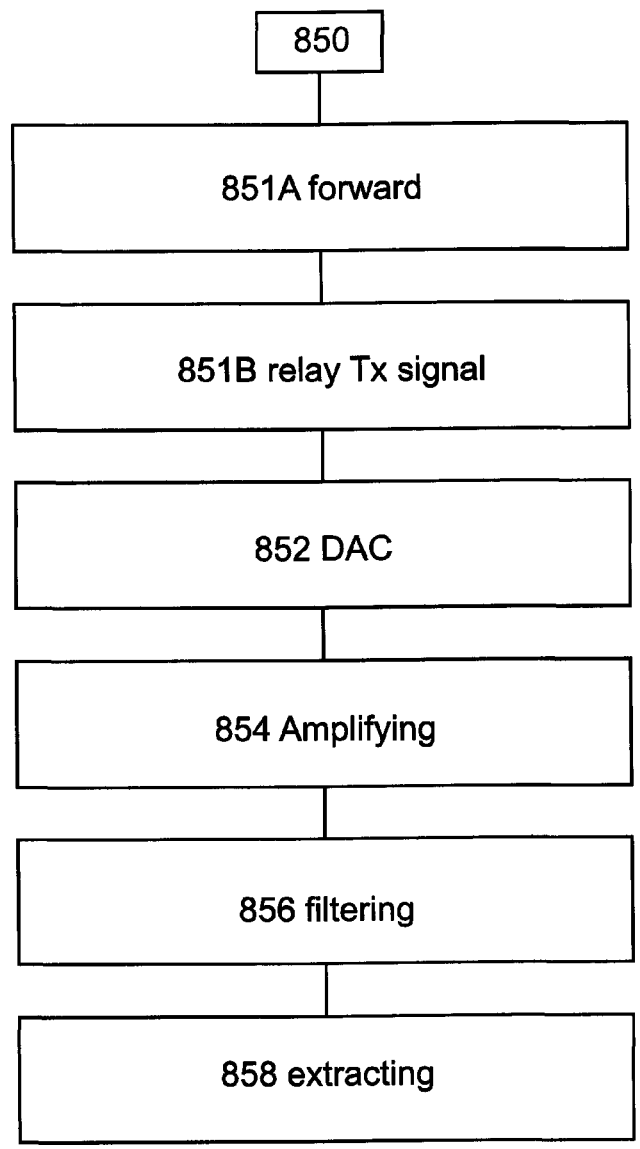
FIG. 3b shows a flow chart illustrating a step of forwarding a calibrated payload signal.

FIG. 3b shows further details of the step 850 of forwarding the payload signal 10. A step 851 comprises forwarding a calibrated payload signal 18-1, 18-2, ..., 18-N along the links 15-1, 15-2, ..., 15-N. The calibrated payload signal 18-1, 18-2, ..., 18-N was generated in the step 851 by applying the phase and amplitude changes 210-1, 210-2, ..., 210-N to the payload signal 10 after the payload signal 10 was split. In the step 851A the calibrated payload signals 18-1, 18-2, ..., 18-N are forwarded to the entry ports 72-1, 72-2, ..., 72-N of the transmit paths 70-1, 70-2, ..., 70-N. In a step 851B the calibrated payload signals 18-1, 18-2, ..., 18-N are relayed as a transmit signal 75-1, 75-2, ..., 75-N along the transmit paths 70-1, 70-2, ..., 70-N when reaching the entry ports 72-1, 72-2, ..., 72-N.

The step 850 comprises a step 852 of digital to analogue converting the transmit signal 75-1, 75-2, ..., 75-N. The step of digital to analogue converting may comprise using the sigma delta digital to analogue convertors 20-1, 20-2, ..., 20-N. It will be appreciated that the use of the sigma delta digital to analogue convertors does not require an up-converting step and a filtering step as is required with traditional digital to analogue converters.

In a step 854 the transmit signal 75-1, 75-2, ..., 75-N is amplified. The amplifying 854 is carried out using the amplifier 30-1, 30-2, ..., 30-N. The step 850 comprises a step of filtering 856 the transmit signal 75-1, 75-2, ..., 75-N. The step of filtering 856 may as well comprise using duplex filters 40-1, 40-2, ..., 40-N. The use of the duplex filters 40-1, 40-2, ..., 40-N is of interest when dealing with the radio system 1 comprising transmit and receive functionalities. A step 858 comprises extracting a coupled transmit signal 90-1, 90-2, ..., 90-N from the transmit signals 75-1, 75-2, ..., 75-N.

Figure 3C:
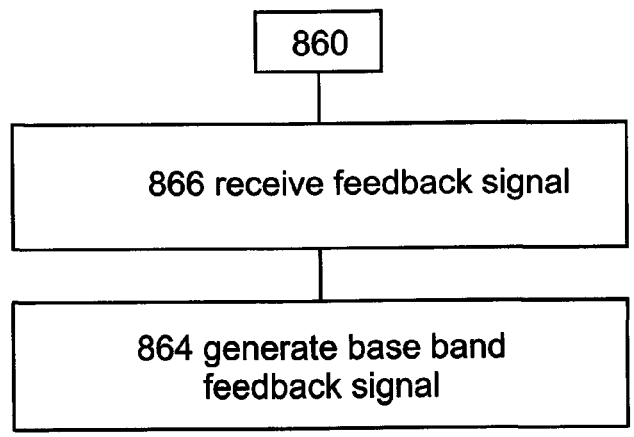
FIG. 3c shows a flow chart illustrating a step of feeding back a selected one of coupled transmit signals.

FIG. 3c shows further details of the step 860 of feeding back the selected one of the coupled transmit signals 90-1, 90-2, ..., 90-N as the feedback signal 90F. The step 860 comprises a step 864 of generating a base band feedback signal 90B in response to the feedback signal 90F within the feedback path 400. The step 864 may further comprise an analogue to digital converting. The step 864 of generating the base band feedback signal 90B may further comprise a filtering of the feedback signal 90F and/or the base band feedback signal 90B. The step 864 may further comprise attenuating the feedback signal 90F received in step 862.

Figure 3D:
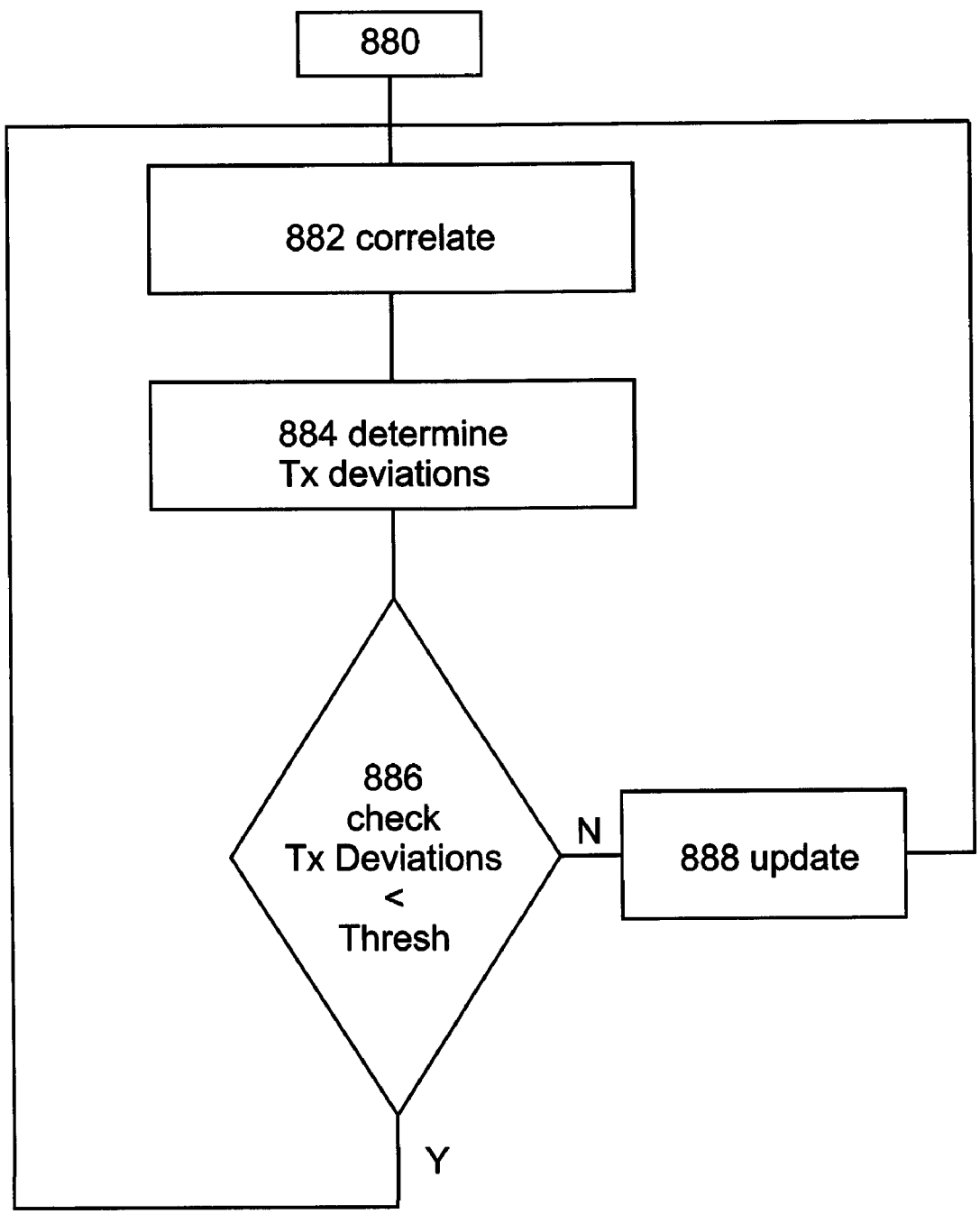
FIG. 3d shows a flow chart illustrating a step of updating the phase and amplitude changes.

FIG. 3d shows details of the step 880 of updating the phase and amplitude changes 210-1, 210-2, . . . , 210-N. A step 882 comprises correlating the payload signal 10 and the base band feedback signal 90B. The step 882 of correlating may be implemented using the first correlator 245a and the second correlator 245b. In a step 884 transmit deviations 90T are derived form the signals correlated in the step 882. In a step 886 it is checked if the transmit deviations 90T are below a predefined threshold. In case the transmit deviations 90T are below the predefined threshold the method 800 returns to the step 882. In case the transmit deviations 90T are not below the predefined threshold in a step 888 an updating of the phase and amplitude changes 210-1, 210-2, . . . , 210-N is carried out, responsive to the transmit deviations 90T derived in the step 886. The updating 888 of the phase and amplitude changes 210-1, 210-2, . . . , 210-N is well known in the art and shall not be discussed any further.

It is to be understood that the method 800 has been explained for the calibration of the phase and amplitude changes 210-1, 210-2, . . . , 210-N for an individual one of the transmit paths 70-1, 70-2 . . . , 70-N within FIGS. 3a-3d. Typically the radio system 1 requires several iterations of the method 800 as described for all the transmit paths 70-1, 70-2, . . . , 70-N to be calibrated.

While various aspects of the present invention have been described above, it should be understood that they have been presented by way of example, and not limitation. It will be apparent to persons skilled in the relevant arts that various changes in form and detail can be made therein without departing from the scope of the invention. For example, any bipolar transistors depicted in the drawings and/or described in the text could be field effect transistors, and vice versa. The resonators need not be a LC-type resonator, but also any other type of suitable resonator, such as a tank or a surface wave resonator. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio system for relaying radio signals and having a calibration of transmit radio signals, the radio system comprising:
   at least one transmit path adapted to relay at least one calibrated payload signal as a transmit,
   a calibration unit adapted to split a payload signal into the at least one calibrated payload signal, wherein the calibration unit is adapted to apply phase and amplitude changes to the at least one calibrated payload signal,
   at least one link adapted to forward the at least one calibrated payload signal to the at least one transmit path,
   a coupler adapted to extract coupled transmit signals,
   a sequential selector adapted to select an individual one of the at least one coupled transmit signals to form a feedback signal to be forwarded along a feedback path;
   wherein the phase and amplitude changes are updatable in response to the feedback signal in the feedback path.

2. The radio system according to claim 1, wherein the phase and amplitude changes are updatable using correlations of the payload signal and a base band feedback signal generated from the feedback signal.

3. The radio system according to claim 1, further comprising a calibration update module for updating the phase and amplitude changes.

4. The radio system according to claim 1, wherein the at least one transmit path is terminated by an antenna element.

5. The radio system according to claim 1, further comprising a feedback signal demodulator adapted to receive the feedback signal.

6. The radio system according to claim 1, wherein the at least one link introduces a phase and amplitude deviation to the at least one calibrated payload signal.

7. The radio system according to claim 1, wherein the at least one transmit path further comprises a digital to analogue converter.

8. The radio system according to claim 7, wherein the digital to analogue converter comprises a sigma delta digital to analogue converter.

9. The radio system according to claim 1, wherein the at least one transmit path further comprises an amplifier for amplifying the transmit signal.

10. The radio system according to claim 1, wherein the at least one transmit path further comprises a filter for filtering the transmit signal.

11. The radio system according to claim 10, wherein the filter comprises a duplex filter.

12. The radio system according to claim 1, further comprising a switch for forwarding a selected one of the coupled transmit signal as the feedback signal into the feedback path.

13. The radio system according to claim 1, further comprising a feedback signal demodulator adapted for generating the base band feedback signal in response to the feedback signal.

14. The radio system according to claim 3, wherein the calibration update module comprises:
- a delay estimator for estimating a delay between the payload signal and the base band feedback signal,
- a shifter adapted to apply a variable delay to the payload signal,
- a first correlator for correlating an in phase component (I) of the payload signal and the base band feedback signal,
- a second correlator for correlating a quadrature component (Q) of the payload signal and the base band feedback signal.

15. The radio system according to claim 14, wherein at least one of the following elements is implemented on a chip: the calibration unit, the calibration update module, the digital to analogue converter the analogue to digital converter, the feedback signal demodulator and the feedback path.

16. The radio system according to claim 15, wherein the chip comprises a digital signal processor (DSP).

17. A method for relaying and calibrating radio signals, the method comprising:
- providing a payload signal,
- generating a calibrated payload signal,
- forwarding a transmit signal along at least one transmit path,
- extracting coupled transmit signals
- sequentially selecting an individual one of the at least one coupled transmit signals to form a feedback signal and feeding back the individual selected one of coupled transmit signals as a feedback signal on a feedback path; and
- updating the phase and amplitude changes in response to the feedback signal.

18. The method according to claim 17, wherein the forwarding of the transmit signal along the at least one transmit path further comprises:
- forwarding at least one calibrated payload signal along at least one link,
- relaying the calibrated payload signal as the transmit signal along at least one transmit path,
- digital to analogue converting the transmit signal,
- amplifying the transmit signal,
- filtering the transmit signal,
- extracting a coupled transmit signal from the at least one transmit path.

19. The method according to claim 17, wherein the feeding back of the selected one of the coupled transmit signals as the feedback signal further comprises:
- generating a base band feedback signal in response to the feedback signal.

20. The method according to claim 17, wherein the feeding back of the selected one of the coupled transmit signals as the feedback signal comprises:
- filtering the feedback signal.

21. The method according to claim 17, wherein the updating of the phase and amplitude changes comprises:
- correlating the payload and the base band feedback signal,
- extracting transmit deviations,
- checking whether the transmit deviations are above a threshold, and
- updating the phase and amplitude changes responsive to the checking.

22. Computer program product embodied on a computer-readable medium and the computer-readable medium comprising executable instructions for the manufacture of the radio system according to claim 1.

23. Computer program product embodied on a computer-readable medium and the computer-readable medium comprising executable instructions for the execution of the method for relaying radio signals according to claim 17.

* * * * *